US012769098B2

(12) United States Patent
Chen

(10) Patent No.: US 12,769,098 B2
(45) Date of Patent: Oct. 20, 2026

(54) PROJECTION LENS GROUP AND PROJECTION DEVICE

(71) Applicant: GOERTEK OPTICAL TECHNOLOGY CO., LTD., Shandong (CN)

(72) Inventor: Pengbo Chen, Weifang (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 302 days.

(21) Appl. No.: 18/289,121

(22) PCT Filed: Nov. 29, 2021

(86) PCT No.: PCT/CN2021/133800

§ 371 (c)(1), (2) Date: Nov. 1, 2023

(87) PCT Pub. No.: WO2022/267342

PCT Pub. Date: Dec. 29, 2022

(65) Prior Publication Data

US 2024/0219694 A1 Jul. 4, 2024

(30) Foreign Application Priority Data

Jun. 22, 2021 (CN) ......................... 202110695242.7

(51) Int. Cl.

*G02B 13/16* (2006.01)
*G02B 9/10* (2006.01)
*G02B 13/18* (2006.01)

(52) U.S. Cl.

CPC ............... *G02B 13/16* (2013.01); *G02B 9/10* (2013.01); *G02B 13/18* (2013.01)

(58) Field of Classification Search

CPC . G02B 5/005; G02B 5/04; G02B 9/10; G02B 9/58; G02B 9/64; G02B 13/002;

(Continued)

(56) References Cited

U.S. PATENT DOCUMENTS

2005/0122599 A1 6/2005 Lu
2008/0130128 A1* 6/2008 Yamashita ............ G02B 13/06 359/649

FOREIGN PATENT DOCUMENTS

CN 108227150 A 6/2018
CN 108333721 A 7/2018

(Continued)

OTHER PUBLICATIONS

Lohmann, Adolf W. “Scaling laws for lens systems.” Applied Optics 28.23 (1989): 4996-4998 (Year: 1989).*

(Continued)

*Primary Examiner* — Ricky L Mack
*Assistant Examiner* — Justin W. Hustoft
(74) *Attorney, Agent, or Firm* — Shih IP Law Group, PLLC

(57) ABSTRACT

Disclosed are a projection lens group and a projection device. The projection lens group is used to project light, and includes a first lens group and a second lens group, wherein the first lens group and the second lens group are sequentially arranged in a propagation direction of the light, the first lens group has a positive focal length, the second lens group has a negative focal length. A focal length of the first lens group denoted by f1, and a focal length of the second lens group denoted by f2 satisfy: 120.0 mm<f1<128.0 mm, and −47.0 mm<f2<−40.0 mm. In the present solution, a projection image can be projected with a shorter distance.

10 Claims, 3 Drawing Sheets

(58) Field of Classification Search
CPC .. G02B 13/02; G02B 13/0045; G02B 13/006; G02B 13/16; G02B 13/18; G02B 15/177; G02B 15/1421; G02B 15/1425; G02B 15/1461; G02B 15/1465; G02B 15/144109; G02B 15/143507; G02B 17/08; G02B 23/02; G02B 27/0955; G02B 15/1441; G02B 15/1445; G02B 15/143505; G03B 21/14
See application file for complete search history.

(56) References Cited

FOREIGN PATENT DOCUMENTS

| | | | |
|---|---|---|---|
| CN | 110515188 | A | 11/2019 |
| CN | 110568586 | A | 12/2019 |
| CN | 110632741 | A | 12/2019 |
| CN | 111596512 | A | 8/2020 |
| CN | 112764298 | A | 5/2021 |
| CN | 113419333 | A | 9/2021 |
| JP | 2004177435 | A | 6/2004 |
| JP | 2009058904 | A | 3/2009 |
| JP | 2015014677 | A | 1/2015 |

OTHER PUBLICATIONS

International Search Report from International Application No. PCT/CN2021/133800 mailed Mar. 11, 2022.

* cited by examiner

PROJECTION LENS GROUP AND PROJECTION DEVICE

TECHNICAL FIELD

The present disclosure relates to a technical field of projection display, and more particularly, to a projection lens group and a projection device.

DESCRIPTION OF RELATED ART

Portable projection equipment can project a projection image with a certain distance, but a throw ratio of current portable projection equipment is about 1.2. The throw ratio refers to a ratio between a projection distance and a horizontal size of the projection image. Since the throw ratio of current projection equipment is relatively high, a large projection space is required to realize projection, which makes it difficult for users to realize projection with a relatively short projection distance.

SUMMARY

In view of the above, to solve the problem that existing projection equipment is difficult to realize a required projection size with a relatively short projection distance, it is necessary to provide a projection lens group and a projection device, which is capable of projecting image with a relatively short distance.

In order to achieve the above purpose, the present disclosure provides a projection lens group, which is used to project light, and the projection lens group includes: a first lens group; and a second lens group, wherein the first lens group and the second lens group are sequentially arranged in a propagation direction of the light, the first lens group has a positive focal length (positive power), the second lens group has a negative focal length (negative power), and an aperture stop is arranged between the first lens group and the second lens group. A focal length of the first lens group denoted by $f_1$ and a focal length of the second lens group denoted by $f_2$ satisfy: 120.0 mm<$f_1$<128.0 mm, and −47.0 mm<$f_2$<−40.0 mm.

Optionally, the first lens group includes a first lens, a second lens and a doublet lens sequentially arranged in the propagation direction of the light, the first lens and the second lens are positive lenses, and the doublet lens is a negative lens. The focal length of the first lens denoted by $f_{11}$, the focal length of the second lens denoted by $f_{12}$, and a focal length of the doublet lens denoted by $f_{3/4}$ satisfy: 13.5 mm<$f_{11}$<16.5 mm, 12.5 mm<$f_{12}$<16.5 mm, and −16.5 mm<$f_{3/4}$<−12.5 mm.

Optionally, a light incident surface and a light exit surface of the first lens are both convex surfaces, and a light incident surface and a light exit surface of the second lens are both convex surfaces.

The doublet lens includes a third lens and a fourth lens sequentially arranged in the propagation direction of the light, a light incident surface of the third lens is a convex surface, a light exit surface of the third lens is a concave surface, a light incident surface and a light exit surface of the fourth lens are both convex surfaces, and the light exit surface of the third lens is bonded to the light incident surface of the fourth lens.

Optionally, at least one of the light incident surface and the light exit surface of the first lens is an aspheric surface.

Optionally, the first lens is formed of glass.

Optionally, the second lens group includes a fifth lens, a sixth lens and a seventh lens sequentially arranged in the propagation direction of the light, the fifth lens is a positive lens, the sixth lens and the seventh lens are negative lenses. A focal length of the fifth lens denoted by $f_{25}$, a focal length of the sixth lens denoted by $f_{26}$, and a focal length of the seventh lens denoted by $f_{27}$ satisfy: 13 mm<$f_{25}$<16 mm, −14.5 mm<$f_{26}$<−10.5 mm, and −15.5 mm<$f_{27}$<−12.5 mm.

Optionally, a light incident surface and a light exit surface of the fifth lens are both convex surfaces, a light incident surface and a light exit surface of the sixth lens are both concave surfaces, a light incident surface of the seventh lens is a concave surface, and a light exit surface of the seventh lens is a convex surface.

Optionally, at least one of the light incident surface and the light exit surface of the seventh lens is an aspheric surface.

Optionally, the projection lens group further includes a vibrating mirror positioned at a side of the first lens group on which light is incident.

Optionally, the projection lens group further includes a prism positioned at a side of the vibrating mirror on which light is incident.

In addition, in order to solve the above problems, the present disclosure also provides a projection device, which includes an image source and a projection lens group as described above, wherein the image source is configured to emit light, and the projection lens group is located at a side of the image source to which light is emitted, and a light exit surface of the image source is provided with a protective glass.

According to embodiments of the present disclosure, when projecting, the light sequentially passes through the first lens group and the second lens group, the first lens group has a positive focal length, and the focal length of the first lens group is in a range of 120.0 mm and 128.0 mm, and within the focal length range, the light can be converged by the first lens group, so that the light can be focused within a short distance. In addition, the second lens group has a negative focal length, and the second lens group has a focal length in a range of −47.0 mm to −40.0 mm, the light can be diverged after passing through the second lens group, so that the size of the projection image is sufficiently large. It can be seen that, according to embodiments of the present disclosure, through the converging light of the first lens group and the diverging light of the second lens group, it is possible to realize the projection with a short distance while ensuring a sufficiently large projection image.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely some embodiments of the present disclosure, and for those of ordinary skill in the art, other drawings can also be obtained from the provided drawings without any creative effort.

REFERENCE SIGNS

Figure 1:
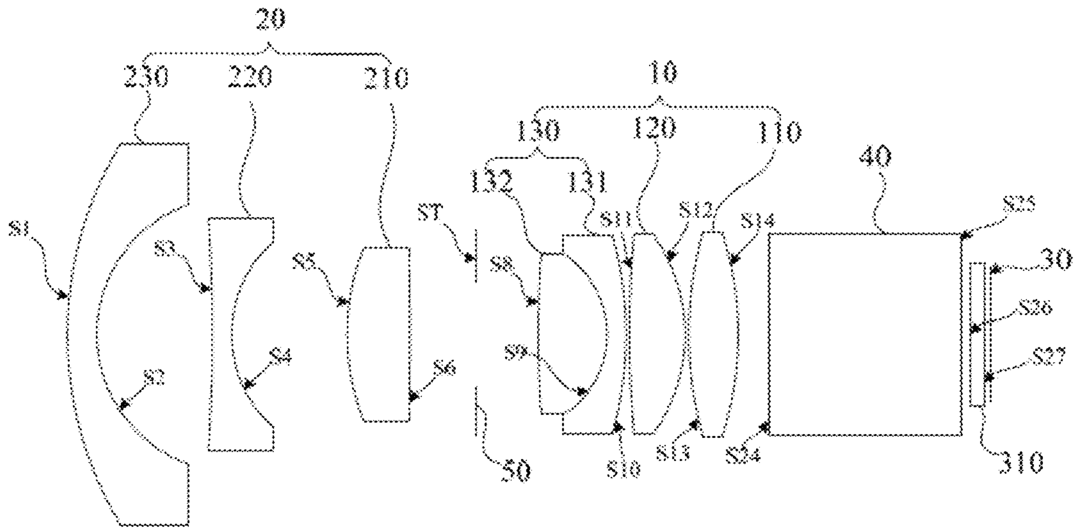
FIG. 1 is a schematic structural view of a projection lens group according to an embodiment of the present disclosure.

| Reference Signs | Elements | Reference Signs | Elements |
|---|---|---|---|
| 10 | first lens group | 220 | sixth lens |
| 110 | first lens | 230 | seventh lens |
| 120 | second lens | 30 | image source |
| 130 | doublet lens | 310 | protective glass |
| 131 | third lens | 40 | prism |
| 132 | fourth lens | 50 | aperture stop |
| 20 | second lens group | 60 | vibrating mirror |
| 210 | fifth lens | | |

The realization of objects, functional features and advantages of the present disclosure will be further described in conjunction with the embodiments and with reference to the accompanying drawings.

DETAILED DESCRIPTIONS

Technical solutions of embodiments of the present disclosure will be described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

It should be noted that all directional indications (such as up, down, left, right, front, back . . . ) in the embodiments of the present disclosure are only used to explain the relative positional relationships and movement conditions, etc. among the components in a specific posture (as shown in the accompanying drawings), and if the specific posture changes, the directional indication will also be changed accordingly.

In addition, “first”, “second”, etc. in the present disclosure are only for descriptive purposes, and should not be construed as indicating or implying their relative importance or implicitly indicating the quantity of indicated technical features. Thus, the features defined with “first”, “second”, etc. may explicitly or implicitly include at least one of these features. In the description of the present disclosure, “a plurality of” means at least two, such as two, three, etc., unless otherwise specifically defined.

In the description of the present disclosure, it should be noted that unless otherwise expressly specified and limited, terms “connect”, “communicate”, “fix”, etc. should be understood in a broad sense. For example, “fix” may refer to a fixed connection, a detachable connection, or may be integrated; may refer to a mechanical connection or an electrical connection; may be directly connected or indirectly connected through an intermediate medium; and it can be an internal communication between two elements. For those of ordinary skill in the art, the specific meanings of the above terms in the present disclosure can be understood according to specific situations.

In addition, the technical solutions of various embodiments of the present disclosure can be combined with each other, but it should be based on the fact that the technical solutions can be realized by those skilled in the art. When the combination of technical solutions is contradictory or cannot be realized, it should be considered that the combination does not exist and is not within the scope of protection required by the present disclosure.

Portable projection equipment is easy to carry due to its small size, and can realize projection of a projection image within a limited space. The throw ratio of current portable projection equipment is greater than 1.0, generally about 1.2. Therefore, it is difficult to realize the projection of the projection image in a narrow space, and a large projection space is required to realize the projection.

In order to solve the above problems, referring to FIG. 1, the present disclosure provides a projection lens group for projecting light. After passing through the projection lens group, the light can form a projection image on a projection surface. The projection lens group includes a first lens group 10 and a second lens group 20. Each of the first lens group 10 and the second lens group 20 includes a plurality of lenses. After passing through the first lens group 10 and the second lens group 20, the light can be effectively converged and magnified to finally obtain a clear image.

The first lens group 10 and the second lens group 20 are sequentially arranged in a propagation direction of the light, the first lens group 10 has a positive focal length, the second lens group 20 has a negative focal length, and an aperture stop 50 is arranged between the first lens group 10 and the second lens group 20. The size of the field of view or the amount of light passing through can be limited by the aperture stop 50. The focal length of the first lens group 10 denoted by $f_1$ and the focal length of the second lens group 20 denoted by $f_2$ satisfy: $120.0\ mm<f_1<128.0\ mm$, and $-47.0\ mm<f_2<-40.0\ mm$. It should be understood that, the first lens group 10 having a positive focal length can converge light, and the second lens group 20 having a negative focal length can diverge light. The focal length of the first lens group 10 being within a range of 120.0 mm to 128.0 mm can ensure that the light passing through the projection lens group can achieve short-distance projection and convergent imaging. The focal length of the second lens group 20 being within a range of −47.0 mm to −40.0 mm can ensure that the size of the projection image is large enough to meet the design requirements. After passing through the first lens group 10 and the second lens group 20, the light can clearly form an image.

According to embodiments of the present disclosure, when projecting, the light sequentially passes through the first lens group 10 and the second lens group 20, the first lens group 10 has a positive focal length, and the focal length of the first lens group 10 is in a range of 120.0 mm and 128.0 mm, and within the focal length range, the light can be converged by the first lens group 10, so that the light can be focused within a short distance. In addition, the second lens group 20 has a negative focal length, and the second lens group 20 has a focal length in a range of −47.0 mm to −40.0 mm, the light may be diverged after passing through the second lens group 20, so that the size of the projection image is sufficiently large. It can be seen that, according to embodiments of the present disclosure, through the converging light of the first lens group 10 and the diverging light of the second lens group 20, it is possible to realize the projection within a short distance while ensuring a sufficiently large projection image.

In the embodiment, the throw ratio of the projection lens group is below 1.0, for example, the throw ratio of the projection lens group is 0.7. In a case of projecting a projection image of 854×480, only a projection distance of 0.7 m is required to realize the projection.

In the above embodiment, in order to further ensure the converging performance of the first lens group 10, the first lens group 10 includes a first lens 110, a second lens 120 and a doublet lens 130 sequentially arranged in the propagation direction of the light, the first lens 110 and the second lens 120 are positive lenses, and the doublet lens 130 is a negative lens. A focal length of the first lens 110 denoted by $f_{11}$, a focal length of the second lens 120 denoted by $f_{12}$, and a focal length of the doublet lens 130 denoted by $f_{3/4}$ satisfy: 13.5 mm<$f_{11}$<16.5 mm, 12.5 mm<$f_{12}$<16.5 mm, and −16.5 mm<$f_{3/4}$<−12.5 mm.

In the embodiment, the focal length ranges of the first lens 110, the second lens 120 and the doublet lens 130 are illustrative, and the light is converged after passing through the first lens 110 and the second lens 120 in sequence. In addition, in order to ensure that the size of the projection image is large enough, the doublet lens 130 is set as a negative lens as a whole, and the light is diverged after passing through the doublet lens 130. And in order to ensure that the volume of the projection lens group is small, the doublet lens 130 is provided such that it effectively shorten the overall volume of the optical path. If the focal length of the first lens 110 is less than 13.5 mm, the convergence distance of the light will be too short, and the projection lens group will be too close to the projection surface, so that it is difficult for the light to form a projection image with a large size. If the focal length of the first lens 110 is greater than 16.5 mm, the convergence distance of the light will be long, and the projection lens group will be far from the projection surface, so that it is difficult to form a projection image in a limited space. For this reason, the focal length of the first lens 110 is set between 13.5 mm and 16.5 mm. Likewise, if the focal length of the second lens 120 is less than 12.5 mm, the convergence distance of the light will be too short, and the projection lens group will be too close to the projection surface, so that it is difficult for the light to form a projection image with a large size. If the focal length of the second lens 120 is greater than 16.5 mm, the convergence distance of the light will be long, and the projection lens group will be far from the projection surface, so that it is difficult to form a projection image in a limited space. For this reason, the focal length of the second lens 120 is set in a range between 12.5 mm and 16.5 mm. Further, in order to avoid excessive divergence of light caused by the doublet lens 130, the focal length of the doublet lens 130 is greater than −16.5 mm, and in order to ensure that the size of the projection image meets the requirements, the focal length of the doublet lens 130 is less than −12.5 mm.

In the above embodiment, in order to further ensure that the converging light of the first lens group 10 realizes a short-distance projection effect, a light incident surface and a light exit surface of the first lens 110 are both convex surfaces, and a light incident surface and a light exit surface of the second lens 120 are both convex surfaces, and the doublet lens 130 includes a third lens 131 and a fourth lens 132 sequentially arranged in the propagation direction of the light, a light incident surface of the third lens 131 is a convex surface, a light exit surface of the third lens 131 is a concave surface, a light incident surface and a light exit surface of the fourth lens 132 are both convex surfaces, and the light exit surface of the third lens 131 is bonded to the light incident surface of the fourth lens 132. It can be known that both the first lens 110 and the second lens 120 are biconvex lenses, and the biconvex lenses can cause the light to be deflected at a large angle, thereby shortening the focus position of the light. Further, in order to effectively bond the doublet lens 130, the concave surface of the third lens 131 and the convex surface of the fourth lens 132 are coupled to each other by surface bonding.

In an embodiment, the light tends to produce aberrations when passing through the first lens group 10 and the second lens group 20. In order to reduce aberrations generated thereby, at least one of the light incident surfaces and the light exit surface of the first lens 110 are aspheric surfaces. By proving the first lens 110 having an aspheric surface or aspheric surfaces, the light near the optical axis and the light at an edge of the lens can be converged as an image point on the same plane, thereby reducing aberrations. In addition, it should be understood that, the design of aspheric surface can reduce aberrations through one optical surface or two optical surfaces. The overall volume of the projection lens group can be reduced when avoiding the use of lenses to reduce aberrations.

In an embodiment, the first lens 110 is close to an image source 30 that emits light. When the image source 30 is in operation, heat may be generated, and the heat will affect the optical parameters of the first lens 110, especially in case where the first lens 110 is made of plastic. The influence of heat on optical parameters, such as the focal length, may lead to poor image quality. In order to reduce the influence of heat on the first lens 110, the first lens 110 is made of glass.

In an embodiment, the second lens group 20 includes a fifth lens 210, a sixth lens 220 and a seventh lens 230 sequentially arranged in the propagation direction of the light. The fifth lens 210 is a positive lens, the sixth lens 220 and the seventh lens 230 are negative lenses. A focal length of the fifth lens 210 denoted by $f_{25}$, a focal length of the sixth lens 220 denoted by $f_{26}$, and a focal length of the seventh lens 230 denoted by $f_{27}$ satisfy: 13 mm<$f_{25}$<16 mm, −14.5 mm<$f_{26}$<−10.5 mm, and −15.5 mm<$f_{27}$<−12.5 mm.

In the embodiment, it is desired that the second lens group 20 can effectively diverge the light and ensure the size of the projection image to be large enough. It should be understood that, in order to avoid excessive divergence of light, the focal length of the sixth lens 220 is greater than −14.5 mm. And in order to ensure that the size of the projection image meets the requirements, the focal length of the sixth lens 220 is less than −10.5 mm. Likewise, in order to avoid excessive divergence of light, the focal length of the seventh lens 230 is greater than −15.5 mm. And in order to ensure that the size of the projection image meets the requirements, the focal length of the seventh lens 230 is less than −12.5 mm. In addition, it should be understood that, in order to enable the light to focus in a short distance, the fifth lens 210 has a positive focal length, and if the focal length of the fifth lens 210 is less than 13 mm, the convergence distance of the light will be too short, and the projection lens group will be too close to the projection surface, so that it is difficult for the light to form a projection image with a large size. If the focal length of the fifth lens 210 is greater than 16 mm, the convergence distance of the light will be long, and the projection lens group will be far from the projection surface, so that it is difficult to form a projection image in a limited space.

In the above embodiment, in order to further ensure the diverging performance of the second lens group 20, a light incident surface and a light exit surface of the sixth lens 220 are concave surfaces, and a light incident surface and a light exit surface of the fifth lens 210 are convex surfaces. It should be understood that, the sixth lens 220 is a biconcave lens, the biconcave lens can effectively diverge light. In addition, the fifth lens 210 is a biconvex lens, so that the light can be effectively converged and an projection image can be formed in a short distance.

In an embodiment, when the light passes through the second lens group 20, there may be a difference between an imaging position of the light near the optical axis and an imaging position near an edge of the second lens group 20, i.e., the light tends to produce aberrations. In order to reduce aberrations, at least one of a light incident surface and a light exit surface of the seventh lens 230 is an aspheric surface. By providing the second lens group 20 having an aspheric surface or aspheric surfaces, the light near an optical axis and the light at an edge of the lens can be converged as an image point on the same plane, thereby reducing aberrations. In addition, it should be understood that, the configuration of aspheric surfaces can reduce aberrations through one optical surface or two optical surfaces. The overall volume of the projection lens group can be reduced when avoiding the use of lenses to reduce aberrations.

Figure 2:
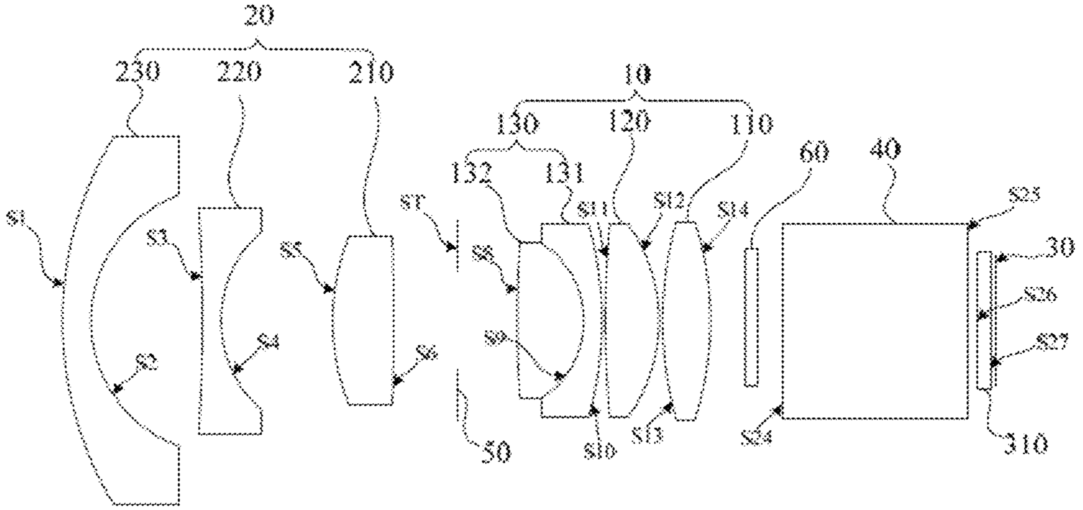
FIG. 2 is a schematic structural view of the projection lens group according to another embodiment of the present disclosure.

As illustrated in FIG. 2, in another embodiment of the present disclosure, the projection lens group further includes a vibrating mirror 60 positioned at a side of the first lens group 10 on which light is incident. Operating the vibrating mirror 60 at a high speed can improve the imaging resolution, and by controlling the operation of the vibrating mirror 60, switching between high and low resolutions of the projection lens group can be realized.

In an embodiment, the projection lens group further includes a prism 40 positioned at a side of the vibrating mirror on which light is incident. The prism 40 can realize the deflection of the optical path, and can shorten the optical path while keeping the optical path unchanged, thereby reducing the overall volume of the projection lens group, and thus can be more portable. An aperture stop 50 is provided between the first lens group 10 and the second lens group 20.

Based on the above-mentioned embodiments, the present disclosure provides specific embodiments of the projection lens group, wherein the seventh lens 230, which is made of plastic material (nd=1.531, vd=55.9), is a meniscus lens with negative focal power, and both surfaces of which are located at a position close to an aperture stop and are aspheric surfaces. The sixth lens 220, which is made of glass material (nd=1.497, vd=81.595), is a biconcave lens with negative focal power, and both surfaces of which are spherical. The fifth lens 210, which is made of glass material (nd=1.74, vd=26.8), is a biconvex lens with positive focal power, and both surfaces of which are spherical. The fourth lens 132, which is made of glass material (nd=1.52, vd=81.3), is a biconvex lens with positive focal power, and both surfaces of which are located at a position close to the aperture stop and are spherical. The third lens 131, which is made of glass material (nd=1.86, vd=28.7), is a meniscus lens with negative focal power, and both surfaces of which are located at a position away from the aperture stop and are spherical. The fourth lens 132 and the third lens 131 are combined into a doublet lens. The second lens 120, which is made of glass material (nd=1.52, vd=81.3), is a biconvex lens with positive focal power, and both surfaces of which are spherical. The first lens 110, which is made of glass material (nd=1.5, vd=82.1), is a biconvex lens with positive focal power, and both surfaces of which are aspheric surfaces. The specific parameters of the projection lens group are listed in the following Table 1.

TABLE 1

| Surface serial Number | Curvature Radius (mm) | Thickness (mm) | Spacing (mm) | refractive index (nd) | Abbe number (vd) | Description |
|---|---|---|---|---|---|---|
| S1 | 18.35 | 1.53 | | 1.531 | 55.9 | the seventh lens |
| S2 | 5.236 | | 6.21 | | | |
| S3 | −90.89 | 1.2 | | 1.497 | 81.595 | the sixth lens |
| S4 | 6.522 | | 6 | | | |
| S5 | 12.22 | 3.39 | | 1.74 | 26.8 | the fifth lens |
| S6 | −233.8 | | 3.56 | | | |
| ST | | | 3.22 | | | aperture stop |
| S8 | 62.2 | 3.66 | | 1.52 | 81.3 | the fourth lens |
| S9 | −4.98 | 0.991 | | 1.86 | 28.7 | the third lens |
| S10 | −17.89 | | 0.1856 | | | |
| S11 | −58.77 | 2.89 | | 1.52 | 81.3 | the second lens |
| S12 | −8.89 | | 0.198 | | | |
| S13 | 17 | 2.569 | | 1.5 | 82.5 | the first lens |
| S14 | −14.157 | | 1.698 | | | |
| S24 | infinity | 10.00 | | 1.622 | 56.722 | prism |
| S25 | infinity | | 0.5 | | | |
| S26 | infinity | 0.7 | | 1.510 | 63.364 | protective glass |
| S27 | infinity | | 0.303 | | | |
| | | | | | | image source |

Among the surfaces, four surfaces are aspheric surfaces, i.e., the surface S1, surface S2 of the seventh lens 230 and the surface S13, surface S14 of the first lens 110, and a curve corresponding to a spherical surface can be obtained by the following aspheric surface formula:

$$Z = \frac{cr^2}{1 + \sqrt{1 - (1 + k)c^2 r^2}} + a_4 r^4 + a_6 r^6 + a_8 r^8 + a_{10} r^{10}$$

In the above formular: Z denotes a distance between a point on the aspheric surface and the optical center of the aspheric surface in the direction of the optical axis; r denotes a distance from the point on the aspheric surface to the optical axis; c denotes a central curvature of the aspheric surface; k denotes a conic rate; and a4, a6, a8 and a10 denote the high-order coefficients of the aspheric surface.

Figure 3:
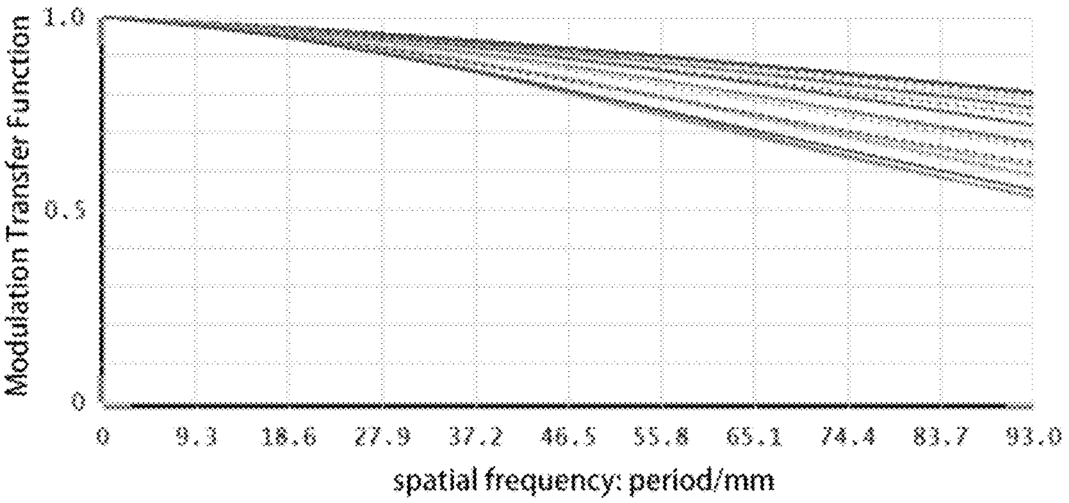
FIG. 3 is a schematic diagram showing the modulation transfer function of the projection lens group of the present disclosure.

FIG. 3 is a schematic diagram showing the modulation transfer function (MTF) of the projection lens group of the present disclosure. The value of MTF indicates the relationship between the degree of modulation and the logarithm of lines per millimeter in the image, and is used to evaluate the ability to restore the details of the scene. The modulation transfer function of the projection lens group is greater than 0.5 in each field of view, and the resolution performance is excellent.

Figure 4:
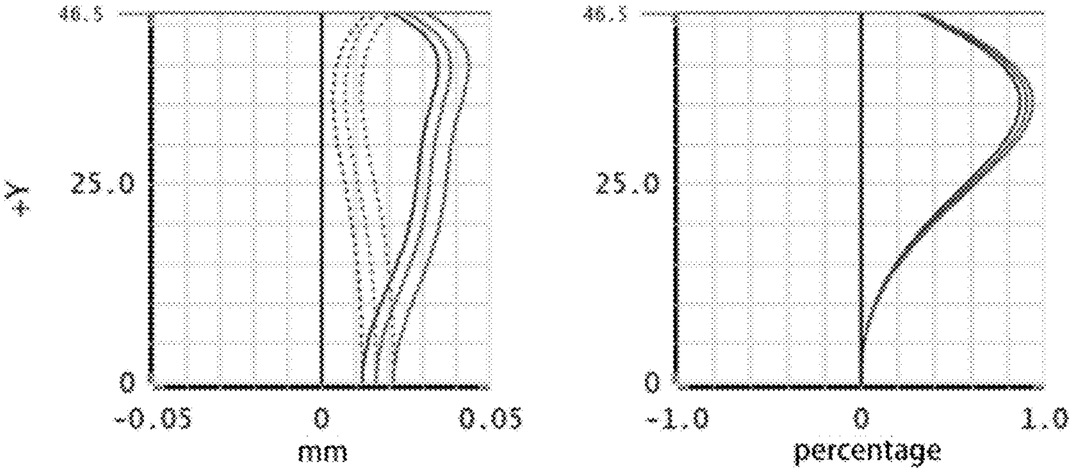
FIG. 4 is a schematic diagram showing the field curvature and distortion of the projection lens group of the present disclosure.

FIG. 4 is a schematic diagram showing the field curvature and distortion of the projection lens group of the present disclosure. Here, the field curvature refers to the curvature of the image field, and is mainly used to indicate the degree of non-coincidence between the actual image point of the corresponding light beam and the ideal image point of the projection lens group. The distortion refers to the aberration of different parts of the object with different magnifications when the object is imaged by the optical component, and the distortion may cause the similarity of the object image to be deteriorated, but it may not affect the clearness of the image. It can be seen from FIG. 4 that the field curvature is less than 0.05 mm, and the distortion is less than 1%.

Figure 5:
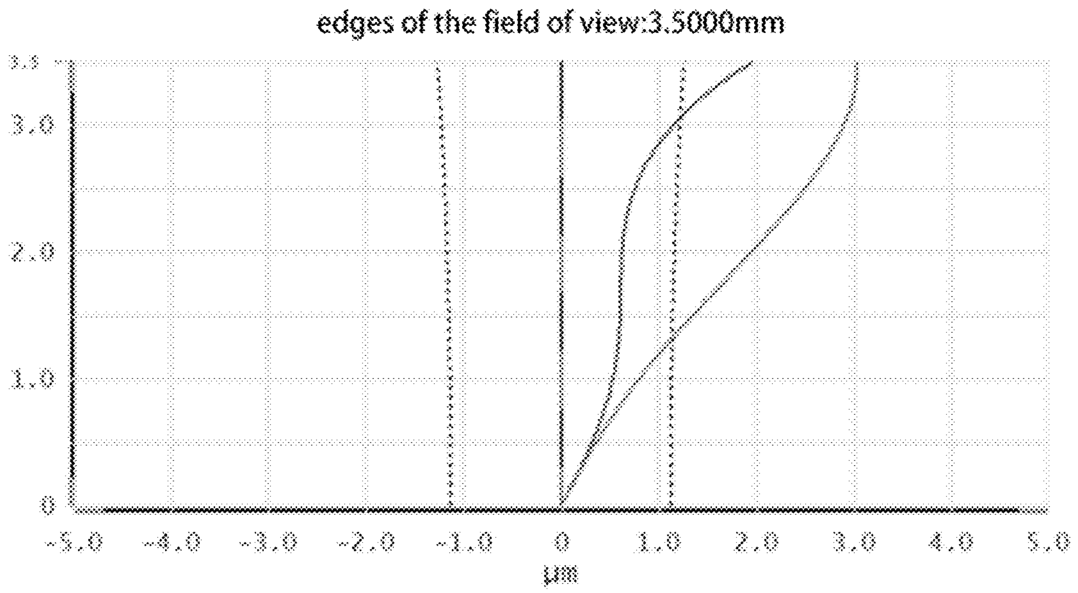
FIG. 5 is a chromatic aberration diagram of the projection lens group of the present disclosure.

FIG. 5 is a chromatic aberration diagram of the projection lens group of the present disclosure. Here, vertical axis chromatic aberration is also called as magnification chromatic aberration, which means that a polychromatic chief ray on the object side becomes multiple rays when emitted from the image side due to dispersion in the refractive system. It can be seen from FIG. 5 that the maximum dispersion is less than 3.0 μm.

The respective order coefficients of the seventh lens 230 and the first lens 110 are shown in Table 2.

TABLE 2

| Surface serial | Aspheric Coefficient | | | | | |
|---|---|---|---|---|---|---|
| Number | c | k | A4 | A6 | A8 | A10 |
| S1 | 0.054 | 0.815 | 2.08E−06 | −5.00E−10 | 2.04E−13 | 0 |
| S2 | 0.194 | −0.765 | 3.24E−06 | 1.03E−06 | 2.05E−09 | 0 |
| S13 | 0.0588 | −8.07 | −6.01E−04 | 5.43E−06 | −1.06E−08 | |
| S14 | −0.07 | −3.52 | −1.45E−05 | 5.02E−08 | −1.88E−11 | 0 |

The present disclosure also provides a projection device, which includes an image source 30 and the projection lens group as described above, wherein the image source 30 is used to emit light, and the projection lens group is disposed at a side of the image source 30 to which light is emitted, and a light exit surface of the image source 30 is provided with a protective glass 310. The protective glass 310 can protect the image source 30 and prevent the image source 30 from being damaged by external force. The display device of the image source 30 includes LCD (Liquid Crystal Display) liquid crystal display, or LED (Light Emitting Diode) light-emitting diode, OLED (Organic Light-Emitting Diode) organic light-emitting diode, LCOS (Liquid Crystal on Silicon) reflective projector, or DMD (Digital Micromirror Device) digital micromirror chip.

The above are only preferred embodiments of the present disclosure, and are not intended to limit the patent scope of the present disclosure. Under the inventive concept of the present disclosure, equivalent structural transformations made by using the description of the present disclosure and the contents of the accompanying drawings, or directly/indirectly applications used in other relevant technical fields, are all included in the patent protection scope of the present disclosure.

What is claimed is:

1. A projection lens group configured to project light, comprising:

a first lens group; and a second lens group, wherein the first lens group and the second lens group are sequentially arranged in a propagation direction of the light, the first lens group has a positive focal length, the second lens group has a negative focal length, and an aperture stop is arranged between the first lens group and the second lens group, and wherein the focal length of the first lens group denoted by $f_1$ and the focal length of the second lens group denoted by $f_2$ satisfy: 120.0 mm<$f_1$<128.0 mm, and −47.0 mm<$f_2$<−40.0 mm, wherein the first lens group comprises a first lens, a second lens and a doublet lens sequentially arranged in the propagation direction of the light, the first lens and the second lens are positive lenses, and the doublet lens is a negative lens, and wherein the focal length of the first lens denoted by $f_{11}$, the focal length of the second lens denoted by $f_{12}$, and a focal length of the doublet lens denoted by far satisfy: 13.5 mm<$f_{11}$<16.5 mm, 12.5 mm<$f_{12}$<16.5 mm, and −16.5 mm<$f_{3/4}$<−12.5 mm.

2. The projection lens group of claim 1, wherein a light incident surface and a light exit surface of the first lens are both convex surfaces, and a light incident surface and a light exit surface of the second lens are both convex surfaces, and wherein the doublet lens comprises a third lens and a fourth lens sequentially arranged in the propagation direction of the light, a light incident surface of the third lens is a convex surface, a light exit surface of the third lens is a concave surface, a light incident surface and a light exit surface of the fourth lens are both convex surfaces, and the light exit surface of the third lens is bonded to the light incident surface of the fourth lens.

3. The projection lens group of claim 1, wherein at least one of the light incident surface and the light exit surface of the first lens is an aspheric surface.

4. The projection lens group of claim 1, wherein the first lens is formed of glass.

5. The projection lens group of claim 1, wherein the second lens group comprises a fifth lens, a sixth lens and a seventh lens sequentially arranged in the propagation direction of the light, the fifth lens is a positive lens, the sixth lens and the seventh lens are negative lenses, and wherein a focal length of the fifth lens denoted by $f_{25}$, a focal length of the sixth lens denoted by $f_{26}$, and a focal length of the seventh lens denoted by $f_{27}$ satisfy: 13 mm<$f_{25}$<16 mm, −14.5 mm<$f_{26}$<−10.5 mm, and −15.5 mm<$f_{27}$<−12.5 mm.

6. The projection lens group of claim 5, wherein a light incident surface and a light exit surface of the fifth lens are both convex surfaces, a light incident surface and a light exit surface of the sixth lens are both concave surfaces, a light incident surface of the seventh lens is a concave surface, and a light exit surface of the seventh lens is a convex surface.

7. The projection lens group of claim 5, wherein at least one of the light incident surface and the light exit surface of the seventh lens is an aspheric surface.

8. The projection lens group of claim 5, further comprising: a vibrating mirror positioned at a side of the first lens group on which light is incident.

9. The projection lens group of claim 8, further comprising: a prism positioned at a side of the vibrating mirror on which light is incident.

10. A projection device, comprising:

an image source; and the projection lens group of claim 1, wherein the image source is configured to emit light, and the projection lens group is located at a side of the image source to which light is emitted, and a light exit surface of the image source is provided with a protective glass.

* * * * *